P. LUCAS.
INVERTED INCANDESCENT GAS LAMP.
APPLICATION FILED MAY 26, 1910.
977,108.
Patented Nov. 29, 1910.
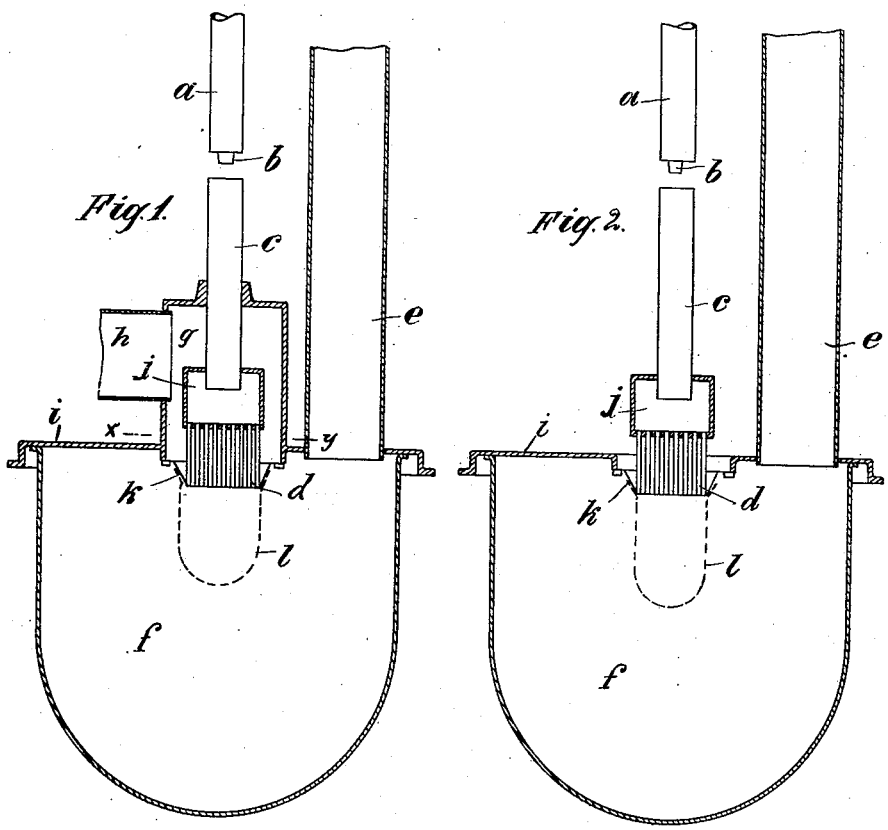
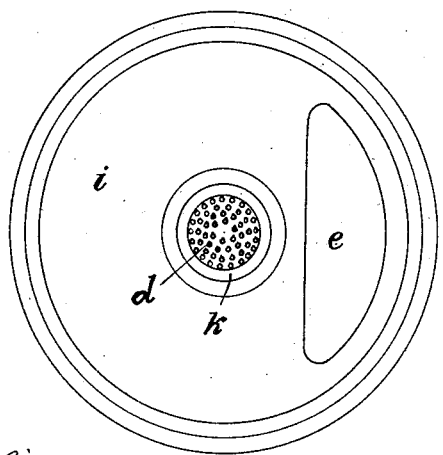
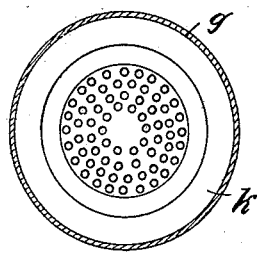
Witnesses:
Katherine Koch
Daniel Holmgren.
Inventor:
Paul Lucas
by his attorneys
Briesen & Knauth
THE NORRIS PETERS CO., WASHINGTON, D. C.

UNITED STATES PATENT OFFICE.

PAUL LUCAS, OF SÜDENDE, NEAR BERLIN, GERMANY.

INVERTED INCANDESCENT GAS-LAMP.

977,108.     Specification of Letters Patent.     Patented Nov. 29, 1910.

Application filed May 26, 1910. Serial No. 563,464.

*To all whom it may concern:*

Be it known that I, PAUL LUCAS, a citizen of the Empire of Germany, residing at Südende, near Berlin, in the Empire of Germany, have invented a new Inverted Incandescent Gas-Lamp, of which the following is a specification.

There are known inverted incandescent gas-lamps comprising a gas tube with nozzle above, a mixing tube thereunder, a chamber at the lower end of the mixing tube with a plurality of pendent thin tubes forming the burner, an inverted incandescent mantle suspended from a ring surrounding the burner, a long and wide chimney surrounding the burner, a cover and a globe, in which lamp the smaller part of the air required for the combustion of the gas is injected into the mixing tube by the gas-jet from the nozzle, while the larger part of the air is sucked in by the draft of the chimney and passes between the thin tubes of the burner to the flame, whereupon the products of the combustion escape upward through the chimney. In such lamps there are special devices provided for heating the burner in order to obtain as high a preliminary heating of the air as possible. Such inverted incandescent gas-lamps present the defect, that by the preliminary heating of the air its volume is multiplied and consequently the weight of the air admitted to the burner is essentially reduced, so that in order to obtain a complete combustion of the gas also the weight of the latter admitted to the burner requires to be diminished. Thus owing to the strong preliminary heating of the air the weight of the mixture of gas and air consumed is small in proportion to the cross area of the burner, so that a flame of great width and insignificant length will result.

My invention relates to improvements in such inverted incandescent gas-lamps, whereby the lamp is enabled to burn the maximum possible quantity of gas in spite of a comparatively small cross area of the burner.

The chief improvement consists in removing the chimney from the burner and in disposing it on the cover outside the burner, so that the excessive preliminary heating of the air supplied to the burner is dispensed with.

Other improvements will be hereinafter set forth.

I will now proceed to describe my invention with reference to the accompanying drawing, in which—

Figure 1 is a vertical longitudinal section through an inverted incandescent gas-lamp embodying my invention, known parts being omitted; Fig. 2 a vertical longitudinal section through a modification; Fig. 3 a horizontal section on line $x$—$y$, Fig. 1, showing the cover in plan, and Fig. 4 a similar section on an enlarged scale through the casing and burner.

Similar letters of reference refer to similar parts throughout the several views.

$a$ in Fig. 1 denotes the gas tube of the lamp provided at its lower end with a nozzle $b$ of any known construction, which is adapted to project the gas in a jet into the mixing tube $c$ and to inject therein the smaller part of the air admitted in any known manner through the annular space between the neighboring ends of the two tubes $a$ and $c$. The mixing tube $c$ is shown to pass through the cover of a casing $g$ made in one with the cover $i$ and to be connected at its lower end with a mixing chamber $j$. The bottom of the latter carries a plurality of pendent thin tubes forming the burner $d$. The casing $g$ is shown to be connected with a tube $h$ on one side, through which the larger part of the air required for the combustion of the gas can be admitted in any known manner. A suitable ring $k$ of any known construction closes the lower end of the annular space between the inside of the casing $g$ and the outside of the burner $d$ and is adapted to carry in any known manner the pendent inverted incandescent mantle $l$.

$f$ denotes the glass globe which is suspended in any known manner from the cover $i$ and is only diagrammatically shown, as its construction is immaterial to my invention.

According to my invention the long and wide chimney $e$ is removed from the burner $d$ and is placed on the cover $i$ outside the burner. It may have any cross section, the essential point being, that its cross area be sufficient for sucking in the secondary air through the tube $h$ and the casing $g$ between the thin tubes of the burner $d$ to the flame and for discharging upward the products of combustion.

As the chimney $e$ is removed from the burner $d$, the weight of gas and air passing through the burner will be increased, so that a long quick flame is produced. Such a flame presents the advantage, that on the one hand the horizontal illuminating effect of the incandescent mantle $l$ is essentially increased, and on the other hand owing to the quickness of the mixing of the secondary air with the primary mixture of gas and air a flame is formed, in which a complete combustion takes place already in the interior of the flame.

The disposition of the chimney $e$ on the cover $i$ without the burner $d$ further permits it to entirely dispense with the casing $g$, so that the burner $d$ is fully exposed to the ambient air, as is clearly shown at Fig. 2. The so modified lamp presents the following advantage.

When the globe $f$ is removed or when it breaks, of course the sucking effect of the chimney $e$ upon the burner $d$ will cease, so that no air will pass downward between the thin tubes of the burner, but on the contrary a small upward draft between the thin tubes will take place. Then the flame will change its direction and pass upward. As, however, the cross area of the burner tubes can suffice for the passage of the air required for the complete combustion of the gas only if the chimney does exert its sucking effect, it is obvious that when the chimney ceases sucking in air, the gas can be burned completely only if air is supplied to it from above. This is rendered possible by the complete exposition of the burner to the ambient air in the lamp illustrated at Fig. 2. With the known constructions of similar lamps the admission of air is in such cases actually rendered impossible by the insufficient cross area of passage, since on the flame striking back also the products of the combustion will have to pass through the same tubes. The consequence of this is, that a part of the gas escapes unburned, which may create great dangers. These dangers are avoided by employing tubes of very ample cross area (such as the tube $h$ in Fig. 1) or, what is the best, by entirely exposing the burner to the ambient air as in Fig. 2.

I claim:

1. In an inverted incandescent gas-lamp, the combination with a gas tube above, of a nozzle at the lower end of said gas tube, a mixing tube beneath said nozzle and adapted to receive the gas jet and the air thereby injected, a mixing chamber at the lower end of said mixing tube, a burner at the bottom of said mixing chamber and consisting of a plurality of pendent thin tubes, an annular cover surrounding said burner, a globe suspended from said cover, a ring closing the space between the outside of said burner and the inside edge of said annular cover, an inverted incandescent mantle suspended from said ring, and a chimney disposed on said annular cover outside said burner and adapted to suck in supplementary air from without between the burner tubes to the flame and to discharge upward the products of combustion.

2. In an inverted incandescent gas-lamp, the combination with a gas tube above, of a nozzle at the lower end of said gas tube, a mixing tube beneath said nozzle and adapted to receive the gas jet and the air thereby injected, a mixing chamber at the lower end of said mixing tube, a burner at the bottom of said mixing chamber and consisting of a plurality of pendent thin tubes, an annular cover surrounding said burner, a globe suspended from said cover, a ring closing the space between the outside of said burner and the inside edge of said annular cover, an inverted incandescent mantle suspended from said ring, a casing on said annular cover and surrounding said mixing chamber, it being adapted to receive air from without, and a chimney disposed on said annular cover outside said casing and adapted to suck in supplementary air from without through said casing between the burner tubes to the flame and to discharge upward the products of combustion.

PAUL LUCAS.

Witnesses:
WALDEMAR HAUPT,
HENRY HASPER.